(12) United States Patent
Tomigashi

(10) Patent No.: US 7,816,876 B2
(45) Date of Patent: Oct. 19, 2010

(54) MOTOR CONTROL DEVICE AND MOTOR DRIVE SYSTEM

(75) Inventor: Yoshio Tomigashi, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 364 days.

(21) Appl. No.: 11/965,060

(22) Filed: Dec. 27, 2007

(65) Prior Publication Data

US 2009/0021195 A1 Jan. 22, 2009

(30) Foreign Application Priority Data

Dec. 27, 2006 (JP) ............................. 2006-351824

(51) Int. Cl.
*H02P 21/00* (2006.01)
(52) U.S. Cl. .................. 318/400.02; 318/727; 318/807
(58) Field of Classification Search ............ 318/400.02, 318/727, 807, 400.34, 400.15, 778, 432
See application file for complete search history.

(56) References Cited

U.S. PATENT DOCUMENTS

| 6,396,229 B1 | 5/2002 | Sakamoto et al. |
| 7,064,517 B2 | 6/2006 | Kiuchi et al. |

(Continued)

FOREIGN PATENT DOCUMENTS

| CN | 1741367 A | 3/2006 |

(Continued)

OTHER PUBLICATIONS

Hajime Hida et al., "Position Sensorless Vector Control for Permanent Magnet Synchronous Motors Based on Maximum Torque Control Frame" by Industry Applications Society of the Instiitute of Electrical Engineers of Japan; included in the Collection of the Lecture Treatises Presented at the 2006 Annual Conference of the industry Applications Society of the Institute of Electrical Engineers of Japan; pp. 385-388 (I-385-I-388); issued Aug. 2006.

(Continued)

*Primary Examiner*—Karen Masih
(74) *Attorney, Agent, or Firm*—Ditthavong, Mori & Steiner, P.C.

(57) ABSTRACT

Let an axis parallel to a magnetic flux produced by a permanent magnet provided on a rotor of a motor be called a d-axis, let an axis leading the d-axis by an electrical angle of 90 degrees be called a q-axis, and let control axes corresponding to the d-axis and the q-axis be called a γ-axis and a δ-axis, respectively. Then, a motor control device performs vector control of the motor with the γ-axis and the δ-axis made different from the d-axis and the q-axis, respectively, and with a motor current passing through the motor broken down into a γ-axis current on the γ-axis and a δ-axis current on the δ-axis. The motor control device has an estimator that estimates, as an estimated magnetic flux, a flux linkage of an armature winding of the motor, or estimates, as an estimated induction voltage, an induction voltage generated by the flux linkage and the rotation of the motor; and a specified current value deriving portion that derives, by using the estimated magnetic flux or the estimated induction voltage, a specified γ-axis current value to be followed by the γ-axis current.

9 Claims, 7 Drawing Sheets

U.S. PATENT DOCUMENTS

2005/0194924 A1 9/2005 Satake et al.
2006/0097688 A1* 5/2006 Patel et al. .................. 318/778

FOREIGN PATENT DOCUMENTS

| EP | 1 630 949 A1 | 3/2006 |
| --- | --- | --- |
| EP | 1630949 B1 | 3/2006 |
| EP | 07 02 5130 | 4/2008 |
| JP | 07-107772 | 4/1995 |
| JP | 10-229700 A | 8/1998 |
| JP | 2000-228892 | 8/2000 |
| JP | 2001-197764 | 7/2001 |
| JP | 2001-251889 A | 9/2001 |
| JP | 2004-015891 A | 1/2004 |
| JP | 2005-168797 A | 6/2005 |
| JP | 2006-67656 A | 3/2006 |
| JP | 2006-204054 | 8/2006 |
| JP | 2006-254572 A | 9/2006 |
| JP | 2006-351824 | 11/2008 |

OTHER PUBLICATIONS

Chinese Office Action for corresponding Patent Application No. CN 200710199360.9, dated Aug. 7, 2009, pp. 1-11, China.

Shigeo Morimoto, et al., "Sensorless Control Strategy for Salient-Pole PMSM Based on Extended EMF in Rotating Reference Frame," IEEE Transactions on Industry Applications, Jul./Aug. 2002, pp. 1054-1061, vol. 38, No. 4, IEEE.

* cited by examiner

MOTOR CONTROL DEVICE AND MOTOR DRIVE SYSTEM

This nonprovisional application claims priority under 35 U.S.C. §119(a) on Patent Application No. 2006-351824 filed in Japan on Dec. 27, 2006, the entire contents of which are hereby incorporated by reference.

BACKGROUND OF THE INVENTION

1. Field of the Invention

The present invention relates to motor control devices that drive and control a motor, and to motor drive systems.

2. Description of Related Art

In general, in motor drive systems that drive a permanent-magnet synchronous motor (hereinafter referred to simply as the "motor"), flux-weakening control is performed by using a negative d-axis current in order to prevent an induction voltage (in other words, electromotive force) from rising excessively when the motor is rotating at high speed.

The induction voltage $V_o$ generated by the rotation of the motor, an inductance of the motor, and an armature flux linkage is generally given by formula (1) below. Assuming that the induction voltage $V_o$ is kept at the voltage limit $V_{om}$ by flux-weakening control gives formula (2) below. Solving formula (2) for a d-axis current gives formula (3) below.

$$V_o = \omega \sqrt{(L_d i_d + \Phi_a)^2 + (L_q i_q)^2} \qquad (1)$$

$$(L_d i_d + \Phi_a)^2 + (L_q i_q)^2 = \left(\frac{V_{om}}{\omega}\right)^2 \qquad (2)$$

$$i_d = -\frac{\Phi_a}{L_d} + \frac{1}{\omega L_d}\sqrt{V_{om}^2 - (\omega L_q i_q)^2} \qquad (3)$$

In the formulae above, $\omega$ represents the rotation speed of the motor, $L_d$ represents the d-axis inductance, $L_q$ represents the q-axis inductance, $\Phi_a$ represents the armature flux linkage ascribable to the permanent magnet, $i_d$ represents the d-axis current, and $i_q$ represents the q-axis current.

In general motor drive systems, flux-weakening control is performed by calculating a flux-weakening current (a specified d-axis current value for flux-weakening control) to be followed by the d-axis current $i_d$ according to formula (3) above.

FIG. 8 shows an example of the configuration of a motor drive system that calculates a flux-weakening current according to the formula (3) above. The motor drive system shown in FIG. 8 is a motor drive system that performs sensorless control. In this motor drive system, the axes estimated, for control purposes, as corresponding to the d-axis and the q-axis are referred to as the γ-axis and the δ-axis, respectively, and vector control is performed in such a way that the γ-axis coincides with the d-axis.

In FIG. 8, $\theta_e$ and $\omega_e$ represent the estimated rotor position and the estimated rotation speed, respectively, $i_u$ and $i_v$ represent the detected U-phase current and V-phase current, respectively, $i_\gamma$ and $i_\delta$ represent the γ-axis current and the δ-axis current, respectively, based on $\theta_e$, $i_u$, and $i_v$, $\omega^*$ represents the specified motor speed value, $i_\gamma^*$ and $i_\delta^*$ represent the specified γ-axis current value and the specified δ-axis current value, respectively, $v_\gamma^*$ and $v_\delta^*$ represent the specified γ-axis voltage value and the specified δ-axis voltage value, respectively, and $v_u^*$, $v_v^*$, and $v_w^*$ represent the specified three-phase voltage values based on $\theta_e$, $v_\gamma^*$, and $v_\delta^*$.

In a case where flux-weakening control is performed in the motor drive system shown in FIG. 8, $i_\gamma^*$ corresponding to the d-axis current represents the flux-weakening current. The magnetic flux controller provided in the motor drive system shown in FIG. 8 calculates the value of the right side of formula (3) above by substituting $\omega_e$ and $i_\delta^*$ for $\omega$ and $i_q$ in formula (3). In this way, $i_\gamma^*$ corresponding to the flux-weakening current is calculated.

There have conventionally been proposed various methods for performing flux-weakening control. For example, there have been disclosed a method for calculating the flux-weakening current based on the battery voltage and the required torque, a method for calculating the flux-weakening current based on the battery voltage and the rotation speed, and a method for correcting the starting rotation speed of flux-weakening control according to the battery voltage.

In addition, there has been disclosed a method for calculating the flux-weakening current (the specified d-axis current value for flux-weakening control) according to formula (4) below. This method exploits the fact that the voltage drop ($\omega L_q i_q$) attributable to the q-axis inductance can be assumed to be equal to the value obtained by subtracting the voltage drop attributable to the resistance from the d-axis voltage. The use of formula (4) makes the flux-weakening current independent from the q-axis inductance. This advantageously eliminates the need to take the influence of magnetic saturation into consideration, for example.

$$i_d = -\frac{\Phi_a}{L_d} + \frac{1}{\omega L_d}\sqrt{V_{om}^2 - (v_d - R_a i_d)^2} \qquad (4)$$

On the other hand, to achieve high-efficiency operation by making effective use of reluctance torque, the specified d-axis current value for achieving high-efficiency operation usually needs to be calculated constantly. Such calculation increases the calculation load. Furthermore, it will take much time to adjust parameters needed to perform such calculation, and the values thus calculated will be affected by the parameter error.

As an effective technique for solving these problems, position sensorless vector control for permanent-magnet synchronous motors based on maximum torque control axes (a dm-axis and a qm-axis, which will be described later) has been disclosed (a description thereof will be given later). Although this vector control using the maximum torque control axes also needs flux-weakening control according to the rotation speed, a method suitable for flux-weakening control based on the maximum torque control axes has yet to be proposed.

In a case where control axes, such as maximum torque control axes, are displaced from the d-axis and the q-axis, it is impossible to perform satisfactory flux-weakening control with a conventional flux-weakening control method using formulae (3), (4) or the like. In this case, weakening magnetic flux becomes too small or too large unless the flux-weakening current is calculated by a calculation method suitable for the control axes other than the d-axis and the q-axis. Too small weakening magnetic flux produces variations in speed (which is caused by a cycle where a shortage of source voltage leads to a shortage of produced torque, which causes a reduction in the rotation speed of the motor, which causes a reduction in the motor induction voltage, which increases the current to be supplied to the motor, which increases the produced torque, which causes an increase in the rotation speed of the motor, which causes a shortage of source voltage again). On the other hand, too large weakening magnetic flux increases losses.

SUMMARY OF THE INVENTION

According to one aspect of the present invention, let an axis parallel to a magnetic flux produced by a permanent magnet provided on a rotor of a motor be called a d-axis, let an axis leading the d-axis by an electrical angle of 90 degrees be called a q-axis, and let control axes corresponding to the d-axis and the q-axis be called a γ-axis and a δ-axis, respectively, then, a motor control device performs vector control of the motor with the γ-axis and the δ-axis made different from the d-axis and the q-axis, respectively, and with a motor current passing through the motor broken down into a γ-axis current on the γ-axis and a δ-axis current on the δ-axis. Here, the motor control device is provided with: an estimator that estimates, as an estimated magnetic flux, a flux linkage of an armature winding of the motor, or estimates, as an estimated induction voltage, an induction voltage generated by the flux linkage and the rotation of the motor; and a specified current value deriving portion that derives, by using the estimated magnetic flux or the estimated induction voltage, a specified γ-axis current value to be followed by the γ-axis current.

Specifically, for example, the motor control device may perform vector control of the motor in such a way that the γ-axis and the δ-axis follow an x-axis and a y-axis, respectively, that are different from the d-axis and the q-axis. When a flux linkage vector on the d-axis is broken down into a flux linkage vector on the x-axis and a flux linkage vector on the y-axis, the estimator may estimate, as the estimated magnetic flux, the magnitude of the flux linkage vector on the x-axis or a γ-axis component of the flux linkage vector on the x-axis. The specified current value deriving portion may derive the specified γ-axis current value by using the estimated magnetic flux.

For example, based on the estimated magnetic flux and the δ-axis current or a specified δ-axis current value to be followed by the δ-axis current, the specified current value deriving portion may derive the specified γ-axis current value.

Alternatively, for example, based on the estimated magnetic flux and a γ-axis component of a voltage applied to the motor, the specified current value deriving portion may derive the specified γ-axis current value.

Specifically, for example, the motor control device may perform vector control of the motor in such a way that the γ-axis and the δ-axis follow an x-axis and a y-axis, respectively, that are different from the d-axis and the q-axis. When an induction voltage vector generated in the motor, the induction voltage vector on the q-axis, is broken down into an induction voltage vector on the x-axis and an induction voltage vector on the y-axis, the estimator may estimate, as the estimated induction voltage, the magnitude of the induction voltage vector on the y-axis or a δ-axis component of the induction voltage vector on the y-axis. The specified current value deriving portion may derive the specified γ-axis current value by using the estimated induction voltage.

For example, based on the estimated induction voltage and the δ-axis current or a specified δ-axis current value to be followed by the δ-axis current, the specified current value deriving portion may derive the specified γ-axis current value.

Alternatively, for example, based on the estimated induction voltage and a γ-axis component of a voltage applied to the motor, the specified current value deriving portion may derive the specified γ-axis current value.

Specifically, for example, the specified γ-axis current value derived by using the estimated magnetic flux or the estimated induction voltage may be a specified γ-axis current value for flux-weakening control.

According to another aspect of the present invention, a motor drive system is provided with: a motor; an inverter that drives the motor; and the motor control device described above, the motor control device controlling the motor by controlling the inverter.

The significance and effect of the present invention will become more apparent from the following detailed description of preferred embodiments thereof. It is to be understood that the significance of the present invention and the significance of terms describing the component elements thereof are not limited in any way by those specifically described in the embodiments below, because those embodiments are merely examples of how the invention can be implemented.

DETAILED DESCRIPTION OF PREFERRED EMBODIMENTS

Hereinafter, the present invention will be described by way of specific embodiments with reference to the accompanying drawings. Among these drawings, such parts that appear more than once are identified with common reference designations, and in principle the description of any part, once given, will not be repeated.

Figure 1:
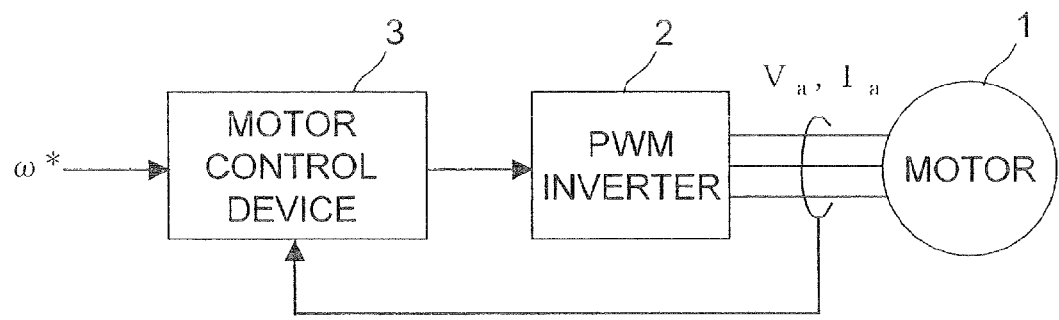
FIG. 1 is a schematic block diagram showing a motor drive system according to an embodiment of the invention.

FIG. 1 is a configuration block diagram showing a motor drive system according to an embodiment of the invention. In FIG. 1, reference numeral 1 represents a three-phase permanent-magnet synchronous motor (hereinafter referred to simply as the "motor 1") having a permanent magnet on a rotor (unillustrated) and having an armature winding on a stator (unillustrated). The motor 1 is a salient-pole motor (a motor having a salient pole) as exemplified by an interior permanent magnet synchronous motor.

Reference numeral 2 represents a PWM (pulse width modulation) inverter that, according to the rotor position of the motor 1, supplies three-phase alternating-current voltages, consisting of U-phase, V-phase, and W-phase voltages, to the motor 1. These voltages applied to the motor 1 are collectively referred to as the motor voltage (armature voltage) $V_a$, and the currents supplied from the PWM inverter 2 to the motor 1 are collectively referred to as the motor current (armature current) $I_a$.

Reference numeral 3 represents a motor control device that, based on the motor current $I_a$, feeds the PWM inverter 2 with a signal for rotating the motor 1 at a desired rotation speed. This desired rotation speed is fed, in the form of a specified motor speed value ω*, from an unillustrated CPU (central processing unit) or the like to the motor control device 3.

Figure 2:
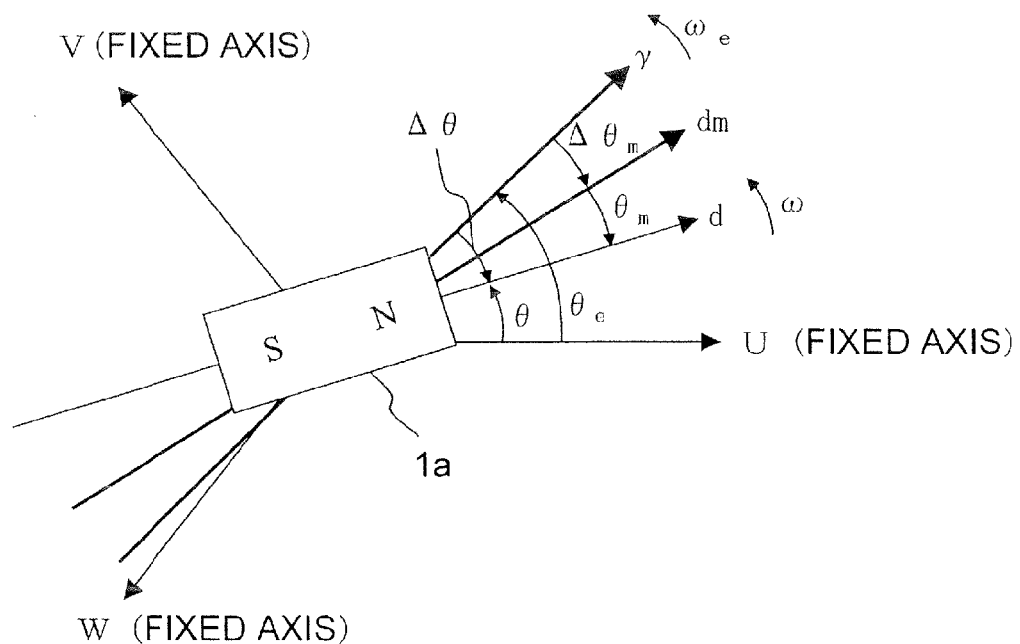
FIG. 2 is an analysis model diagram according to the embodiment of the invention.
Figure 3:
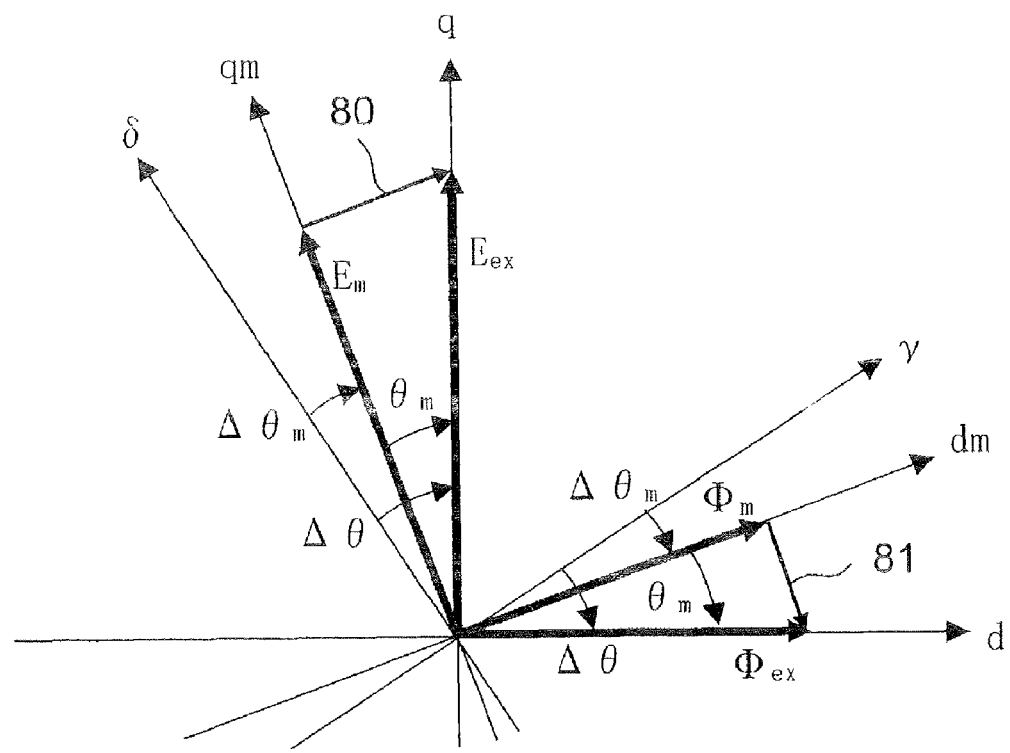
FIG. 3 is an analysis model diagram according to the embodiment of the invention.

FIGS. 2 and 3 are analysis model diagrams of the motor 1 which are applied to this embodiment. In the following description, what is referred to simply by the "armature winding" should be understood to mean the armature winding provided on the motor 1.

FIG. 2 shows the U-phase, V-phase, and W-phase armature winding fixed axes. Reference numeral 1a represents the permanent magnet constituting the rotor of the motor 1. In a rotating coordinate system that rotates at the same speed as the magnetic flux produced by the permanent magnet 1a, the direction of the magnetic flux produced by the permanent magnet 1a is referred to as the d-axis, and the control axis corresponding to the d-axis is referred to as the γ-axis. Moreover, as shown in FIG. 3, the axis having a phase leading the d-axis by an electrical angle of 90 degrees is referred to as the q-axis, and the axis having a phase leading the γ-axis by an electrical angle of 90 degrees is referred to as the δ-axis. The rotating coordinate system corresponding to the real axes has the d- and q-axes as its coordinate axes, and its coordinate axes are called the d-q axes (d-q rotating coordinate axes). The rotating coordinate system estimated for control purposes has the γ- and δ-axes as its coordinate axes, and its coordinate axes are called the γ-δ axes (γ-δ rotating coordinate axes).

The d-q axes rotates, and its rotation speed is called the real motor speed ω. The γ-δ axes also rotates, and its rotation speed is called the estimated motor speed $ω_e$. With respect to the d-q axes in rotation, the phase of the d-axis at a given moment is represented, relative to the U-phase armature winding fixed axis, by θ, and is called the real rotor position. Likewise, with respect to the γ-δ axes in rotation, the phase of the γ-axis at that given moment is represented, relative to the U-phase armature winding fixed axis, by $θ_e$, and is called the estimated rotor position. Then, the axis error Δθ between the d- and γ-axes is given by $Δθ=θ-θ_e$.

The rotation axis whose direction coincides with that of the current vector to be fed to the motor 1 when maximum torque control is achieved is called the qm-axis. The rotation axis that lags behind the qm-axis by an electrical angle of 90 degrees is called the dm-axis. The coordinate axes consisting of the dm- and qm-axes is called the dm-qm axes (dm-qm rotating coordinate axes).

The motor current that achieves maximum torque control has a positive q-axis component and a negative d-axis component. Thus, the qm-axis leads the q-axis in phase. The lead in phase occurs counter-clockwise in FIGS. 2 and 3.

The phase (angle) of the q-axis relative to the qm-axis is represented by $θ_m$, and the phase (angle) of the qm-axis relative to the δ-axis is represented by $Δθ_m$. Then, needless to say, the phase of the d-axis relative to the dm-axis also equals $θ_m$, and the phase of the dm-axis relative to the γ-axis also equals $Δθ_m$. What $θ_m$ represents is the lead angle of the qm-axis (dm-axis) relative to the q-axis (d-axis). What $Δθ_m$ represents is the axis error between the qm-axis and the δ-axis. The value of Δθ, which is the axis error between the d- and γ-axes, is given by $Δθ=Δθ_m+θ_m$.

As described above, here, it is assumed that the dm-axis leads the d-axis in phase and that $θ_m$ is then negative. Likewise, when the γ-axis leads the dm-axis in phase, $Δθ_m$ is negative. The vectors (such as $E_m$) shown in FIG. 3 will be described later.

The γ-axis, δ-axis, d-axis, q-axis, dm-axis, and qm-axis components of the motor voltage $V_a$ are referred to as the γ-axis voltage $v_γ$, δ-axis voltage $v_δ$, d-axis voltage $v_d$, q-axis voltage $v_q$, dm-axis voltage $v_{dm}$, and qm-axis voltage $v_{qm}$ respectively; the γ-axis, δ-axis, d-axis, q-axis, dm-axis, and qm-axis components of the motor current $I_a$ are referred to as the γ-axis current $i_γ$, δ-axis current $i_δ$, d-axis current $i_d$, q-axis current $i_q$, dm-axis current $i_{dm}$, and qm-axis current $i_{qm}$ respectively.

Moreover, in the following description, $R_a$ represents the motor resistance (the resistance of the armature winding of the motor 1); $L_d$ and $L_q$ respectively represent the d-axis and q-axis inductances (the d-axis and q-axis components of the inductance of the armature winding of the motor 1); $Φ_a$ represents the armature flux linkage ascribable to the permanent magnet 1a. The values of $L_d$, $L_q$, $R_a$, and $Φ_a$ are determined at the time of the fabrication of the motor drive system, and are used by the motor control device 3 to perform calculations.

Description of Extension Induction Voltage Model on dm-qm Axes

A description will be given below of a theoretical formula involved in estimating the dm-qm axes. It is to be noted that a detailed description of the dm and qm-axes is found in the specification and the like of Japanese Patent Application filed as No. 2006-177646 and in the treatise titled "Position Sensorless Vector Control for Permanent Magnet Synchronous Motors Based on Maximum Torque Control Frame" by Hida et al.; published by the Industry Applications Society of the Institute of Electrical Engineers of Japan; included in the Collection of the Lecture Treatises Presented at the 2006 Annual Conference of the Industry Applications Society of the Institute of Electrical Engineers of Japan; pp. 385-388 (I-385-I-388); August 2006 (hereinafter "Non-Patent Document 1").

The common extension induction voltage equation on the d-q axes is given by formula (A1), and the extension induction voltage (extension electromotive force) $E_{ex}$ is given by formula (A2). In the formulae below, p represents the differential operator.

$$\begin{bmatrix} v_d \\ v_q \end{bmatrix} = \begin{bmatrix} R_a + pL_d & -\omega L_q \\ \omega L_q & R_a + pL_d \end{bmatrix} \begin{bmatrix} i_d \\ i_q \end{bmatrix} + \begin{bmatrix} 0 \\ E_{ex} \end{bmatrix} \quad (A1)$$

$$E_{ex} = \omega((L_d - L_q)i_d + \Phi_a) - (L_d - L_q)(pi_q) \quad (A2)$$

Performing coordinate conversion so that formula (A1) on the real axes is converted into one on the γ-δ axes (control axes) gives formula (A3). Ignoring the third term in the right side of formula (A3) for the sake of simplicity gives formula (A4).

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex}\begin{bmatrix} -\sin\Delta\theta \\ \cos\Delta\theta \end{bmatrix} - (p\Delta\theta)L_d\begin{bmatrix} -i_\delta \\ i_\gamma \end{bmatrix} \quad (A3)$$

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex}\begin{bmatrix} -\sin\Delta\theta \\ \cos\Delta\theta \end{bmatrix} \quad (A4)$$

Rewriting formula (A4) with respect to the dm-qm axes gives formula (A5).

$$\begin{bmatrix} v_{dm} \\ v_{qm} \end{bmatrix} = \begin{bmatrix} R_a + pL_d & -\omega L_q \\ \omega L_q & R_a + pL_d \end{bmatrix} \begin{bmatrix} i_{dm} \\ i_{qm} \end{bmatrix} + E_{ex}\begin{bmatrix} -\sin\theta_m \\ \cos\theta_m \end{bmatrix} \quad (A5)$$

Here, it is assumed that $L_{q1}i_{qm}$ is given by formula (A6). Rearranging formula (A5) based on formula (A6) gives formula (A7). Here, $E_m$ is given by formula (A8). The symbol $L_{q1}$ represents the virtual inductance that depends on $\theta_m$. Here, $L_{q1}$ is defined for the sake of convenience to handle the $E_{ex} \cdot \sin \theta_m$ present in the second term in the right side of formula (A5) as the voltage drop across the virtual inductance. Incidentally, $L_{q1}$ is negative.

$$L_{q1}i_{qm} = \sin\theta_m\{\Phi_a + (L_d - L_q)i_d\} \qquad (A6)$$
$$= \sin\theta_m\{\Phi_a + (L_d - L_q)i_{qm}\sin\theta_m\}$$

$$\begin{bmatrix} v_{dm} \\ v_{qm} \end{bmatrix} = \begin{bmatrix} R_a + pL_d & -\omega(L_q + L_{q1}) \\ \omega L_q & R_a + pL_d \end{bmatrix} \begin{bmatrix} i_{dm} \\ i_{qm} \end{bmatrix} + E_m \begin{bmatrix} 0 \\ 1 \end{bmatrix} \qquad (A7)$$

$$E_m = (\omega((L_d - L_q)i_d + \Phi_a) - (L_d - L_q)(pi_q))\cos\theta_m = E_{ex}\cos\theta_m \qquad (A8)$$

Here, it is assumed that the equation $L_m = L_q + L_{q1}$ holds. Now, formula (A7) can be rearranged into formula (A9). Here, $E_{exm}$ is given by formula (A10) below.

$$\begin{bmatrix} v_{dm} \\ v_{qm} \end{bmatrix} = \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_m \end{bmatrix} + \qquad (A9)$$
$$\omega(L_q - L_m)\begin{bmatrix} 0 & 0 \\ 1 & 0 \end{bmatrix}\begin{bmatrix} i_{dm} \\ i_{qm} \end{bmatrix}$$
$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_m + \omega(L_q - L_m)i_{dm} \end{bmatrix}$$
$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_{exm} \end{bmatrix}$$

$$E_{exm} = (\omega((L_d - L_q)i_d + \Phi_a) - (L_d - L_q)(pi_q))\cos\theta_m + \qquad (A10)$$
$$\omega(L_q - L_m)i_{dm}$$
$$= E_m + \omega(L_q - L_m)i_{dm}$$

Define $\Phi_{exm} = E_{exm}/\omega$; then formula (A9) above can be rearranged into formula (A11) below. Here, $\Phi_{exm}$ is given by formula (A12) below (assuming that the differential terms are ignored).

$$\begin{bmatrix} v_{dm} \\ v_{qm} \end{bmatrix} = \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ \omega \Phi_{exm} \end{bmatrix} \qquad (A11)$$

$$\Phi_{exm} = ((L_d - L_q)i_d + \Phi_a)\cos\theta_m + (L_q - L_m)i_{dm} \qquad (A12)$$

Performing coordinate conversion so that formula (A9) is converted into one on the $\gamma$-$\delta$ axes gives formula (A13). Likewise, performing coordinate conversion so that formula (A11) is converted into one on the $\gamma$-$\delta$ axes gives formula (A14).

$$\begin{bmatrix} v_\gamma \\ v_\delta \end{bmatrix} = \begin{bmatrix} R_a + pL_d & -\omega L_m \\ \omega L_m & R_a + pL_d \end{bmatrix} \begin{bmatrix} i_\gamma \\ i_\delta \end{bmatrix} + \qquad (A13)$$
$$E_{exm}\begin{bmatrix} -\sin\Delta\theta_m \\ \cos\Delta\theta_m \end{bmatrix} - (p\Delta\theta_m)L_d\begin{bmatrix} -i_\delta \\ i_\gamma \end{bmatrix}$$

$$\begin{bmatrix} v_\gamma \\ v_\delta \end{bmatrix} = \begin{bmatrix} R_a + pL_d & -\omega L_m \\ \omega L_m & R_a + pL_d \end{bmatrix} \begin{bmatrix} i_\gamma \\ i_\delta \end{bmatrix} + \qquad (A14)$$
$$\omega\Phi_{exm}\begin{bmatrix} -\sin\Delta\theta_m \\ \cos\Delta\theta_m \end{bmatrix} - (p\Delta\theta_m)L_d\begin{bmatrix} -i_\delta \\ i_\gamma \end{bmatrix}$$

Now, with reference to FIG. 3, a description will be given of the relationship among $E_{ex}$, $E_m$, and $E_{exm}$. Consider $E_{ex}$, $E_m$ and $E_{exm}$ as voltage vectors in a rotating coordinate system. Then, $E_{ex}$ can be called an extension induction voltage vector. The extension induction voltage vector $E_{ex}$ is an induction voltage vector on the q-axis. The extension induction voltage vector $E_{ex}$ can be broken down into an induction voltage vector on the qm-axis and an induction voltage vector on the dm-axis. As will be understood from formula (A8) above, of these vectors thus broken down, the induction voltage vector on the qm-axis is $E_m$; and the induction voltage vector ($E_{ex} \cdot \sin \theta_m$) on the dm-axis, indicated by reference numeral 80 in FIG. 3, is the voltage drop vector attributable to the virtual inductance $L_{q1}$.

As will be understood from formula (A10), $E_{exm}$ is the sum of $E_m$ and $\omega(L_q - L_m)i_{dm}$. Thus, in the rotating coordinate system, $E_{exm}$, like $E_m$, is an induction voltage vector on the qm-axis. In maximum torque control, as described above, $i_{dm} \approx 0$, and hence $E_{exm}$ is (substantially) equal to $E_m$.

Next, a description will be given of the magnetic flux corresponding to $E_{ex}$, $E_m$, and $E_{exm}$. Here, it is assumed that what $E_{ex}$ represents is an induction voltage generated by the flux linkage $\Phi_{ex}$ of the motor 1 and the rotation of the motor 1. That is, it is assumed that $\Phi_{ex} = E_{ex}/\omega$ holds.

Consider $\Phi_{ex}$ as a flux linkage vector in a rotating coordinate system; then, the flux linkage vector $\Phi_{ex}$ is a flux linkage vector on the d-axis. The flux linkage vector $\Phi_{ex}$ can be broken down into a flux linkage vector on the qm-axis and a flux linkage vector on the dm-axis. Of these vectors thus broken down, the flux linkage vector on the dm-axis is represented by $\Phi_m$, and fulfills $\Phi_m = E_m/\omega$; the flux linkage vector ($\Phi_{ex} \cdot \sin \theta_m$) on the qm-axis, indicated by reference numeral 81 in FIG. 3, is a magnetic flux vector attributable to the virtual inductance $L_{q1}$.

Define $\Phi_{exm} = E_{exm}/\omega$; then $\Phi_{exm}$ is the sum of $\Phi_m$ and $(L_q - L_m)i_{dm}$. Thus, in the rotating coordinate system, $\Phi_{exm}$, like $\Phi_m$, is a flux linkage vector on the dm-axis. In maximum torque control, as described above, $i_{dm} \approx 0$, and hence $\Phi_{exm}$ is (substantially) equal to $\Phi_m$.

Flux-Weakening Control on the dm-qm Axes

This embodiment deals with a case in which the axis error $\Delta\theta_m$ between the dm-axis and the $\gamma$-axis is estimated, and thereby the $\gamma$-axis, which is a control axis (estimated axis), is made to converge to the dm-axis (that is, the axis error $\Delta\theta_m$ is made to converge to zero). Then, the motor current $I_a$ is broken down into the qm-axis current $i_{qm}$ parallel to the qm-axis and the dm-axis current $i_{dm}$ parallel to the dm-axis, and thereby the motor 1 is vector-controlled.

Since the dm-qm axes differs from the d-q axes, if formula (3) or (4) above is applied as it is to the calculation of a specified dm-axis current value based on which the weakening magnetic flux is produced, it is impossible to achieve satisfactory flux-weakening control. Thus, in the following description, a flux-weakening control method suitable for estimating the dm-qm axes will be considered.

Assume that an induction voltage generated by the rotation of the motor 1, the inductance of the motor 1, and the armature flux linkage $\Phi_a$ is equal to the voltage limit $V_{om}$. Then, formula (B1) below holds.

$$(L_m i_{dm} + \Phi_{exm})^2 + (L_m i_{qm})^2 = \left(\frac{V_{om}}{\omega}\right)^2 \quad (B1)$$

Solving formula (B1) for $i_{dm}$ gives formula (B2) below. The value thus obtained represents the specified dm-axis current value to be followed by the dm-axis current for achieving flux-weakening control. Here, control is so performed that the axis error $\Delta\theta_m$ is made to converge to zero. Thus, when an approximation is made such that $\Delta\theta_m \approx 0$, formula (B2) below is rearranged into formula (B3) below. Here, the symbol $\Phi_{exm\gamma}$ represents a γ-axis component of the flux linkage vector $\Phi_{exm}$ on the dm-axis. Incidentally, a δ-axis component of the flux linkage vector $\Phi_{exm}$ is represented by $\Phi_{exm\delta}$. Now, the method described in JP-A-2006-204054 (the method based on formula (4) above) is applied to the dm-qm axes. That is, by exploiting the fact that the voltage drop $(\omega L_m i_{qm})$ attributable to $L_m$ can be assumed to be equal to the value obtained by subtracting the voltage drop attributable to the resistance from the dm-axis voltage, $i_{dm}$ is given by formula (B4) below. When an approximation is made such that $\Delta\theta_m \approx 0$, formula (B4) below is rearranged into formula (B5) below.

$$i_{dm} = -\frac{\Phi_{exm}}{L_m} + \frac{1}{\omega L_m}\sqrt{V_{om}^2 - (\omega L_m i_{qm})^2} \quad (B2)$$

$$i_{dm} = -\frac{\Phi_{exm\gamma}}{L_m} + \frac{1}{\omega L_m}\sqrt{V_{om}^2 - (\omega L_m i_{qm})^2} \quad (B3)$$

$$i_{dm} = -\frac{\Phi_{exm}}{L_m} + \frac{1}{\omega L_m}\sqrt{V_{om}^2 - (v_{dm} - R_a i_{dm})^2} \quad (B4)$$

$$i_{dm} = -\frac{\Phi_{exm\gamma}}{L_m} + \frac{1}{\omega L_m}\sqrt{V_{om}^2 - (v_{dm} - R_a i_{dm})^2} \quad (B5)$$

As will be understood from formula (B6) below, $\Phi_{exm}/L_m$ varies depending on $i_{qm}$, $\theta_m$, and $i_{dm}$.

$$-\frac{\Phi_{exm}}{L_m} = -\frac{1}{L_m}((L_d - L_q)\cdot i_d + \Phi_a)\cos\theta_m - \frac{1}{L_m}(L_q - L_m)\cdot i_{dm} \quad (B6)$$

$$= -\frac{1}{L_m}((L_d - L_q)\cdot(i_{dm}\cos\theta_m + i_{qm}\sin\theta_m) + \Phi_a)\cos\theta_m -$$

$$\frac{1}{L_m}(L_q - L_m)\cdot i_{dm}$$

When calculating the specified dm-axis current values for flux-weakening control (that is, the right sides of formulae (B2) to (B5) above) by using formulae (B2) to (B5) above, it is necessary simply to use $\Phi_{exm}$ that is estimated according to formulae (B7), (B8), and (B9) below, or $\Phi_{exm\gamma}$ that is estimated as a substitute for $\Phi_{exm}$. Using a rearranged form of the first and second lines of formula (A14) (a determinant) gives formulae (B7) and (B8) (assuming that the third term in the right side of formula (A14) is ignored).

$$\Phi_{exm\gamma} = \frac{v_\delta - (R_a + pL_d)i_\delta}{\omega} - L_m i_\gamma \quad (B7)$$

$$\Phi_{exm\delta} = \frac{v_\gamma - (R_a + pL_d)i_\gamma}{\omega} + L_m i_\delta \quad (B8)$$

$$\Phi_{exm} = \sqrt{\Phi_{exm\gamma}^2 + \Phi_{exm\delta}^2} \quad (B9)$$

Alternatively, formulae (B2) to (B5) may be rearranged into formulae using the induction voltage instead of the magnetic flux. That is, the specified dm-axis current value for flux-weakening control may be calculated by using any one of formulae (B10) to (B13) below. In a case where the axis error $\Delta\theta_m$ is estimated by estimating the induction voltage, formulae (B10) to (B13) are more convenient to use than formulae (B2) to (B5). Formula (B11) and formula (B13) can be obtained by applying an approximation $\Delta\theta_m \approx 0$ to formula (B10) and formula (B12), respectively. Here, $E_{exm\delta}$ represents a δ-axis component of the induction voltage vector $E_{exm}$ on the qm-axis. Incidentally, a γ-axis component of the induction voltage vector $E_{exm}$ is represented by $E_{exm\gamma}$.

$$i_{dm} = -\frac{E_{exm}}{\omega L_m} + \frac{1}{\omega L_m}\sqrt{V_{om}^2 - (\omega L_m i_{qm})^2} \quad (B10)$$

$$i_{dm} = -\frac{E_{exm\delta}}{\omega L_m} + \frac{1}{\omega L_m}\sqrt{V_{om}^2 - (\omega L_m i_{qm})^2} \quad (B11)$$

$$i_{dm} = -\frac{E_{exm}}{\omega L_m} + \frac{1}{\omega L_m}\sqrt{V_{om}^2 - (v_{dm} - R_a i_{dm})^2} \quad (B12)$$

$$i_{dm} = -\frac{E_{exm\delta}}{\omega L_m} + \frac{1}{\omega L_m}\sqrt{V_{om}^2 - (v_{dm} - R_a i_{dm})^2} \quad (B13)$$

Like $\Phi_{exm}/L_m$, $E_{exm}/\omega L_m$ varies depending on $i_{qm}$, $\theta_m$, and $i_{dm}$. Thus, when calculating the specified dm-axis current value for flux-weakening control (that is, the right sides of formulae (B10) to (B13) above) by using formulae (B10) to (B13) above, it is necessary simply to use $E_{exm}$ that is estimated according to formulae (B14), (B15), and (B16) below, or $E_{exm\delta}$ that is estimated as a substitute for $E_{exm}$. Using a rearranged form of the first and second lines of formula (A13) (a determinant) gives formulae (B14) and (B15) (assuming that the third term in the right side of formula (A13) is ignored).

$$E_{exm\gamma} = v_\gamma - (R_a + pL_d)i_\gamma + \omega L_m i_\delta \quad (B14)$$

$$E_{exm\delta} = v_\delta - (R_a + pL_d)i_\delta - \omega L_m i_\gamma \quad (B15)$$

$$E_{exm} = \sqrt{E_{exm\gamma}^2 + E_{exm\delta}^2} \quad (B16)$$

Description of the Specific Configuration

Figure 4:
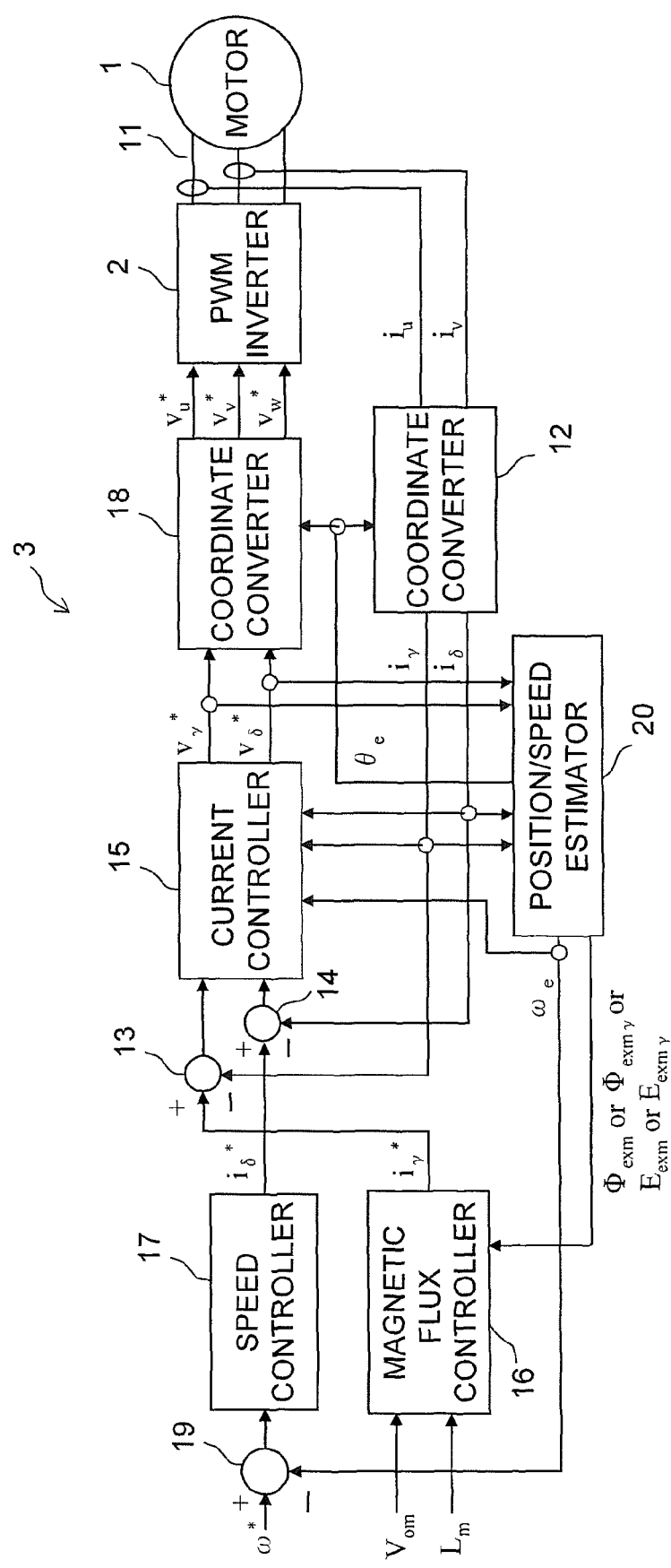
FIG. 4 is a detailed block diagram showing the motor drive system according to the embodiment of the invention.

Next, an example of the specific configuration of the motor drive system that achieves the flux-weakening control described above will be described. FIG. 4 is a block diagram of the motor drive system, showing the inside of the motor control device 3 in detail.

Vector control performed for the motor 1 falls into two broad categories: vector control using a position sensor (not shown) for detecting a real rotor position and vector control using no position sensor, which is in particular called sensorless vector control. The motor control device 3 shown in FIG.

4 is a motor control device for achieving sensorless vector control. In a case where sensorless vector control based on the dm-qm axes is performed, on the assumption that γ-axis coincides with the dm-axis, $v_\gamma$ and $i_\gamma$ are used as substitutes for $v_{dm}$ and $i_{dm}$, respectively (the same holds for $v_{qm}$).

The motor control device 3 includes a current detector 11, a coordinate converter 12, a subtractor 13, a subtractor 14, a current controller 15, a magnetic flux controller 16, a speed controller 17, a coordinate converter 18, a subtractor 19, and a position/speed estimator 20 (hereinafter the "estimator 20"). The different parts constituting the motor control device 3 can freely use all the values produced within the motor control device 3 as necessary.

The current detector 11 detects the U-phase current $i_u$ and the V-phase current $i_v$, which are U- and V-phase components, respectively, of the motor current $I_a$. The U-phase current $i_u$ represents a current passing through a U-phase armature winding of the motor 1; the V-phase current $i_v$ represents a current passing through a V-phase armature winding of the motor 1. The coordinate converter 12 receives the U-phase current $i_u$ and V-phase current $i_v$ detected by the current detector 11, and converts them into the γ-axis current $i_\gamma$ and δ-axis current $i_\delta$ based on the estimated rotor position $\theta_e$ fed from the estimator 20.

The estimator 20 estimates and outputs the estimated rotor position $\theta_e$ and the estimated motor speed $\omega_e$, and outputs information needed by the magnetic flux controller 16. The detailed operation of the estimator 20 will be described later.

The subtractor 19 subtracts from the specified motor speed value ω* the estimated motor speed $\omega_e$ fed from the estimator 20, and outputs the result of the subtraction (speed error). The speed controller 17 produces and outputs the specified δ-axis current value $i_\delta^*$ such that the subtraction result (ω*−$\omega_e$) of the subtractor 19 converges to zero. The magnetic flux controller 16 outputs the specified γ-axis current value $i_\gamma^*$. The specified γ-axis current value $i_\gamma^*$ represents the current (current value) to be followed by the γ-axis current $i_\gamma$; the specified δ-axis current value $i_\delta^*$ represents the current (current value) to be followed by the δ-axis current $i_\delta$. The method for calculating $i_\gamma^*$ will be described later.

The subtractor 13 subtracts the γ-axis current $i_\gamma$ outputted from the coordinate converter 12 from the specified γ-axis current value $i_\gamma^*$ outputted from the magnetic flux controller 16, and thereby calculates the current error ($i_\gamma^* - i_\gamma$). The subtractor 14 subtracts the δ-axis current $i_\delta$ outputted from the coordinate converter 12 from the specified δ-axis current value $i_\delta^*$ outputted from the speed controller 17, and thereby calculates the current error ($i_\delta^* - i_\delta$).

Based on the current errors calculated by the subtractors 13 and 14, the γ-axis current $i_\gamma$ and δ-axis current $i_\delta$ from the coordinate converter 12, and the estimated motor speed $\omega_e$ from the estimator 20, the current controller 15 calculates the specified γ-axis voltage value $v_\gamma^*$ and the specified δ-axis voltage value $v_\delta^*$ such that the γ-axis current $i_\gamma$ follows the specified γ-axis current value $i_\gamma^*$ and in addition that the γ-axis current $i_\delta$ follows the specified δ-axis current value $i_\delta^*$, and outputs them. The specified γ-axis voltage value $v_\gamma^*$ represents a γ-axis component (i.e., $v_\gamma$) of the motor voltage $V_a$ to be applied to the motor 1; the specified δ-axis voltage value $v_\delta$ represents a δ-axis component (i.e., $v_\delta$) of the motor voltage $V_a$ to be applied to the motor 1.

Based on the estimated rotor position $\theta_e$ fed from the estimator 20, the coordinate converter 18 converts the specified γ-axis voltage value $v_\gamma^*$ and specified δ-axis voltage value $v_\delta^*$ into specified three-phase voltage values, and then outputs them to the PWM inverter 2. The specified three-phase voltage values consist of a specified U-phase voltage value $v_u^*$, a specified V-phase voltage value $v_v^*$, and a specified W-phase voltage value $v_w^*$ representing U-, V-, and W-phase components of the motor voltage $V_a$, respectively.

Based on the specified three-phase voltage values ($v_u^*$, $v_v^*$, and $v_w^*$), which represent the voltages to be applied to the motor 1, the PWM inverter 2 produces pulse-width-modulated signals, and supplies the motor current $I_a$ commensurate with the specified three-phase voltage values to the motor 1 to drive it.

Figure 5:
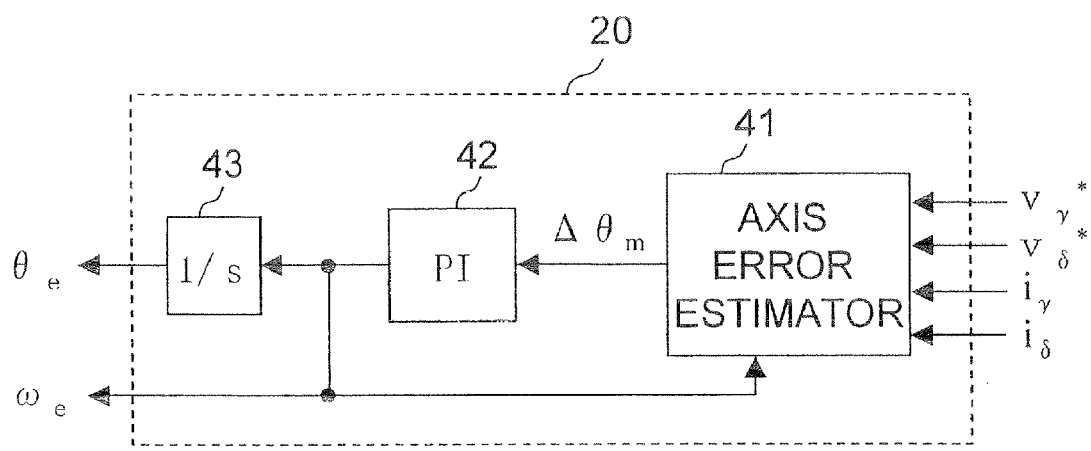
FIG. 5 is an internal block diagram showing the position/speed estimator shown in FIG. 4.

A description will be given below of the estimator 20. FIG. 5 is an internal block diagram showing the estimator 20. The estimator 20 shown in FIG. 5 includes an axis error estimator 41, a proportional-plus-integral calculator 42, and an integrator 43.

The axis error estimator 41 estimates the axis error $\Delta\theta_m$ by using all or part of the values of $v_\gamma^*$, $v_\delta^*$, $i_\gamma$, and $i_\delta$. To achieve PLL (phase locked loop) control, the proportional-plus-integral calculator 42, cooperating with the different parts constituting the motor control device 3, performs proportional-plus-integral control to calculate the estimated motor speed $\omega_e$ such that the axis error $\Delta\theta_m$ calculated by the axis error estimator 41 converges to zero. The integrator 43 integrates the estimated motor speed $\omega_e$ outputted from the proportional-plus-integral calculator 42, and thereby calculates the estimated rotor position $\theta_e$. The estimated motor speed $\omega_e$ outputted from the proportional-plus-integral calculator 42 and the estimated rotor position $\theta_e$ outputted from the integrator 43 are fed, as the values outputted from the estimator 20, to different parts of the motor control device 3 that need them.

Various methods for estimating the axis error $\Delta\theta_m$ can be adopted to make the axis error estimator 41 estimate the axis error $\Delta\theta_m$. For example, the axis error $\Delta\theta_m$ is estimated by using any one of formulae (C1) to (C4) below. As will be understood from FIG. 3, since $\Delta\theta_m = \tan^{-1}(-\Phi_{exm\delta}/\Phi_{exm\gamma})$ holds, formula (C1) holds. The same holds for formulae (C2) to (C4).

$$\Delta\theta_m = \tan^{-1}\frac{-\Phi_{exm\delta}}{\Phi_{exm\gamma}} \quad (C1)$$

$$= \tan^{-1}\frac{-\left(\frac{v_\gamma - (R_a + pL_d)i_\gamma}{\omega} + L_m i_\delta\right)}{\frac{v_\delta - (R_a + pL_d)i_\delta}{\omega} - L_m i_\gamma}$$

$$\approx \frac{\frac{v_\gamma - (R_a + pL_d)i_\gamma}{\omega} + L_m i_\delta}{\frac{v_\delta - (R_a + pL_d)i_\delta}{\omega} - L_m i_\gamma}$$

$$\Delta\theta_m = \sin^{-1}\left(\frac{-\Phi_{exm\delta}}{\Phi_{exm}}\right) \quad (C2)$$

$$= \sin^{-1}\frac{-\left(\frac{v_\gamma - (R_a + pL_d)i_\gamma}{\omega} + L_m i_\delta\right)}{\Phi_{exm}}$$

$$\approx \frac{-\left(\frac{v_\gamma - (R_a + pL_d)i_\gamma}{\omega} + L_m i_\delta\right)}{\Phi_{exm}}$$

$$\Delta\theta_m = \tan^{-1}\frac{-E_{exm\gamma}}{E_{exm\delta}} \quad (C3)$$

$$= \tan^{-1}\frac{-(v_\gamma - (R_a + pL_d)i_\gamma + \omega L_m i_\delta)}{v_\delta - (R_a + pL_d)i_\delta - \omega L_m i_\gamma}$$

$$\approx -\frac{v_\gamma - (R_a + pL_d)i_\gamma + \omega L_m i_\delta}{v_\delta - (R_a + pL_d)i_\delta - \omega L_m i_\gamma}$$

-continued $$\Delta\theta_m = \sin^{-1}\left(\frac{-E_{exm\gamma}}{E_{exm}}\right) \quad (C4)$$

$$= \sin^{-1}\frac{-(v_\gamma - (R_a + pL_d)i_\gamma + \omega L_m i_\delta)}{E_{exm}}$$

$$\approx \frac{v_\gamma - (R_a + pL_d)i_\gamma + \omega L_m i_\delta}{E_{exm}}$$

When calculating the axis error $\Delta\theta_m$ by using any one of formulae (C1) to (C4), the values of $v_\gamma^*$, $v_\delta^*$, and $\omega_e$ are used as the values of $v_\gamma$, $v_\delta$, and $\omega$, respectively, in the formulae above. When calculating $\Delta\theta_m$, the differentiation terms $pL_d i_\gamma$ and (or) $pL_d i_\delta$ can be ignored. The values of $\Phi_{exm}$ and $E_{exm}$ can be calculated according to formulae (B7) to (B9) and (B14) to (B16) above.

Moreover, to calculate the value of $L_m$ needed to calculate $\Delta\theta_m$, formula (D1) below is used. Formula (D1) is obtained by substituting $i_{dm}=0$ and formulae (D2) and (D3) below in formula (A6) above, and then solving the resulting formula for $L_{q1}$.

$$L_m = L_q + L_{q1} \quad (D1)$$

$$= L_q + \frac{i_d\{\Phi_a + (L_d - L_q)i_d\}}{i_d^2 + i_q^2}$$

$$i_{qm} = \sqrt{i_d^2 + i_q^2} \quad (D2)$$

$$\sin\theta_m = \frac{i_d}{\sqrt{i_d^2 + i_q^2}} \quad (D3)$$

Rearranging formula (D1) above using formula (D4), which gives the d-axis current $i_d$ that achieves maximum torque control, and formula (D2), which gives (an approximation of) the relationship among $i_d$, $i_q$, and $i_{qm}$, gives $L_m$ as a function of $i_{qm}$ (i.e., the terms of $i_d$ and $i_q$ are eliminated from the calculation formula of $L_m$). Hence, assuming that $i_\delta \approx i_{qm}$, the axis error estimator 41 can calculate, based on $i_\delta$, the value of $L_m$ given as a function of $i_{qm}$.

$$i_d = \frac{\Phi_a}{2(L_q - L_d)} - \sqrt{\frac{\Phi_a^2}{4(L_q - L_d)^2} + i_q^2} \quad (D4)$$

Alternatively, the value of $L_m$ may be calculated by assuming that $i_\delta \approx i_{qm}$ and using an approximation formula that gives $L_m$ as a function of $i_\delta$; or different values of $L_m$ corresponding to different values of $i_\delta$ may be previously prepared in the form of table data so that the value of $L_m$ is determined by referring to the table data. Moreover, as described in Non-Patent Document 1, the value of $L_m$ may be previously fixed.

Now, the operation of the magnetic flux controller 16 will be described. The magnetic flux controller 16 produces different $i_\gamma^*$ depending on the type of control to be achieved, namely maximum torque control and flux-weakening control.

As will be clear from the definition of the qm-axis, the motor current $I_a$ as observed in maximum torque control only has a qm-axis component. Thus, when achieving maximum torque control, the magnetic flux controller 16 sets $i_\gamma^*$ to zero or a predetermined value close to zero. Adopting the dm-qm axes makes it easy to adjust parameters needed to achieve maximum torque control, and helps alleviate the calculation load.

On the other hand, when achieving flux-weakening control, the magnetic flux controller 16 calculates $i_\gamma^*$ by using any one of formulae (E1) to (E8), and feeds the calculated $i_\gamma^*$ the subtractor 13. Formulae (E1) to (E4) correspond to formulae (B2) to (B5), respectively; formulae (E5) to (E8) correspond to formulae (B10) to (B13), respectively.

$$i_\gamma^* = -\frac{\Phi_{exm}}{L_m} + \frac{1}{\omega L_m}\sqrt{V_{om}^2 - (\omega L_m i_\delta')^2} \quad (E1)$$

$$i_\gamma^* = -\frac{\Phi_{exm\gamma}}{L_m} + \frac{1}{\omega L_m}\sqrt{V_{om}^2 - (\omega L_m i_\delta')^2} \quad (E2)$$

$$i_\gamma^* = -\frac{\Phi_{exm}}{L_m} + \frac{1}{\omega L_m}\sqrt{V_{om}^2 - (v_\gamma^* - R_a i_\gamma')^2} \quad (E3)$$

$$i_\gamma^* = -\frac{\Phi_{exm\gamma}}{L_m} + \frac{1}{\omega L_m}\sqrt{V_{om}^2 - (v_\gamma^* - R_a i_\gamma')^2} \quad (E4)$$

$$i_\gamma^* = -\frac{E_{exm}}{\omega L_m} + \frac{1}{\omega L_m}\sqrt{V_{om}^2 - (\omega L_m i_\delta')^2} \quad (E5)$$

$$i_\gamma^* = -\frac{E_{exm\delta}}{\omega L_m} + \frac{1}{\omega L_m}\sqrt{V_{om}^2 - (\omega L_m i_\delta')^2} \quad (E6)$$

$$i_\gamma^* = -\frac{E_{exm}}{\omega L_m} + \frac{1}{\omega L_m}\sqrt{V_{om}^2 - (v_\gamma^* - R_a i_\gamma')^2} \quad (E7)$$

$$i_\gamma^* = -\frac{E_{exm\delta}}{\omega L_m} + \frac{1}{\omega L_m}\sqrt{V_{om}^2 - (v_\gamma^* - R_a i_\gamma')^2} \quad (E8)$$

When calculating $i_\gamma^*$ by using any one of formulae (E1) to (E8), as the value of $\omega$ in the formulae above, the value of $\omega_e$ or $\omega^*$ is used; as the value of $L_m$, what is used by the axis error estimator 41 as such is used; and the value of $v_\gamma^*$ is fed from the current controller 15. Moreover, the value of $\Phi_{exm}$, $\Phi_{exm\gamma}$, $E_{exm}$, or $E_{exm\delta}$ is fed from the estimator 20. Thus, for example, in a case where the estimator 20 uses formula (C1), formula (C2), formula (C3), or formula (C4) above when calculating $\Delta\theta_m$, $i_\gamma^*$ simply has to be calculated by using formula (E2) or (E4), formula (E1) or (E3), formula (E6) or (E8), or formula (E5) or (E7), respectively. The value of the voltage limit $V_{om}$ is determined according to the value of the source voltage of the PWM inverter 2.

Here, $i_\delta^*$ outputted from the speed controller 17 or $i_\delta$ outputted from the coordinate converter 12 is used as $i_\delta'$ in formulae (E1), (E2), (E5), and (E6). The different parts of the motor control device 3 constantly calculate the values (such as $i_\delta$ and $i_\delta^*$) needed to perform vector control at predetermined intervals in a discrete manner. It is possible to use as $i_\delta'$ the most recently outputted $i_\delta^*$ itself or the most recently outputted $i_\delta$ itself. Alternatively, a high-frequency component of $i_\delta^*$ constantly outputted from the speed controller 17 or $i_\delta$ constantly outputted from the coordinate converter 12 may be removed by using a low-pass filter (not shown), and $i_\delta^*$ or $i_\delta$ from which the high-frequency component is removed may be used as $i_\delta'$. This helps prevent a sudden change in $i_\delta'$.

In addition, $i_\gamma^*$ calculated the last time or $i_\gamma$ outputted from the coordinate converter 12 is used as $i_\gamma'$ in formulae (E3), (E4), (E7), and (E8). Alternatively, a high-frequency component of $i_\gamma^*$ that is constantly calculated or $i_\gamma$ constantly outputted from the coordinate converter 12 may be removed by using a low-pass filter (not shown), and $i_\gamma^*$ or $i_\gamma$ from which the high-frequency component is removed may be used as $i_\gamma'$. This helps prevent a sudden change in $i_\gamma'$.

Figure 6:
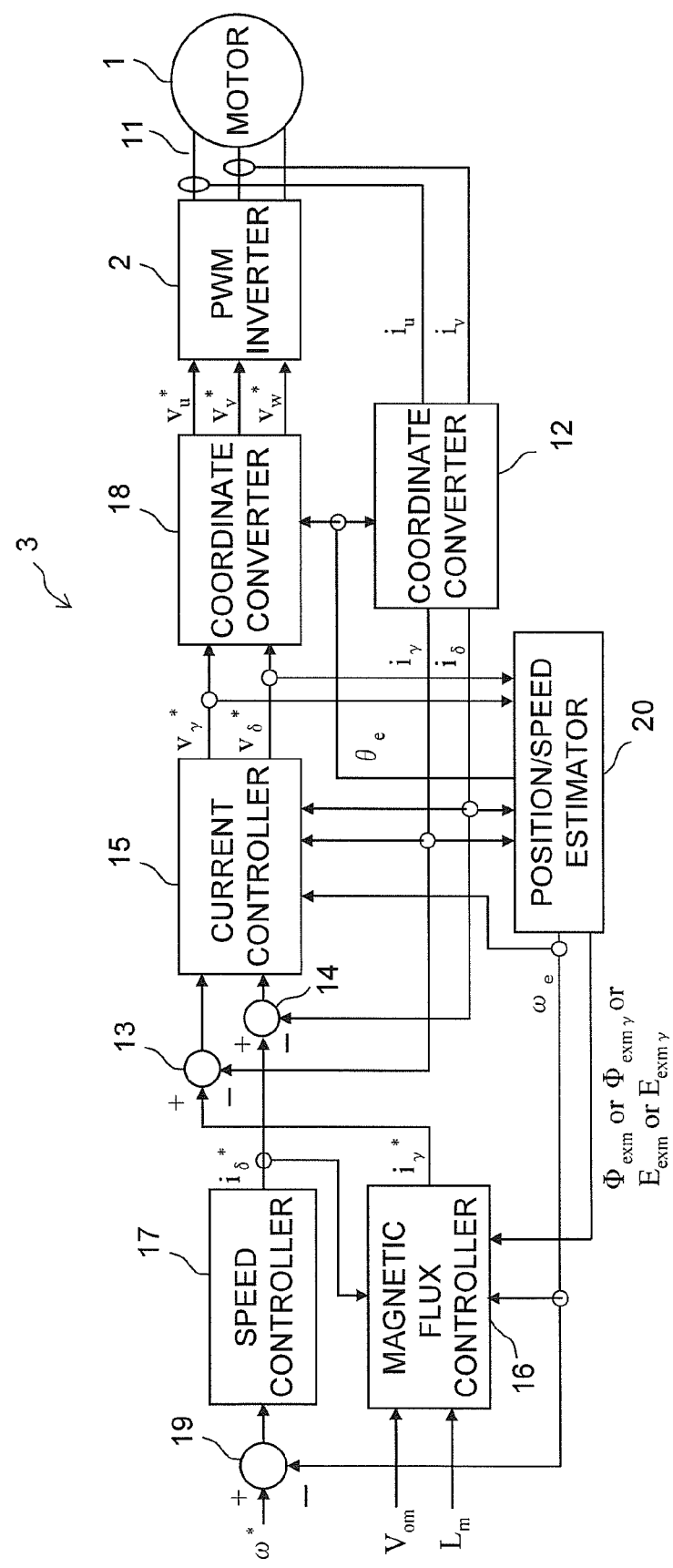
FIG. 6 is a diagram showing a configuration of the motor drive system shown in FIG. 4.

FIG. 6 shows a configuration of the motor drive system in which $i_\gamma^*$ for flux-weakening control is calculated by using formula (E1), (E2), (E5), or (E6). In the motor drive system shown in FIG. 6, when calculating $i_\gamma^*$, $\omega_e$ is used as $\omega$, and $i_\delta'$ is determined based on $i_\delta^*$.

Figure 7:
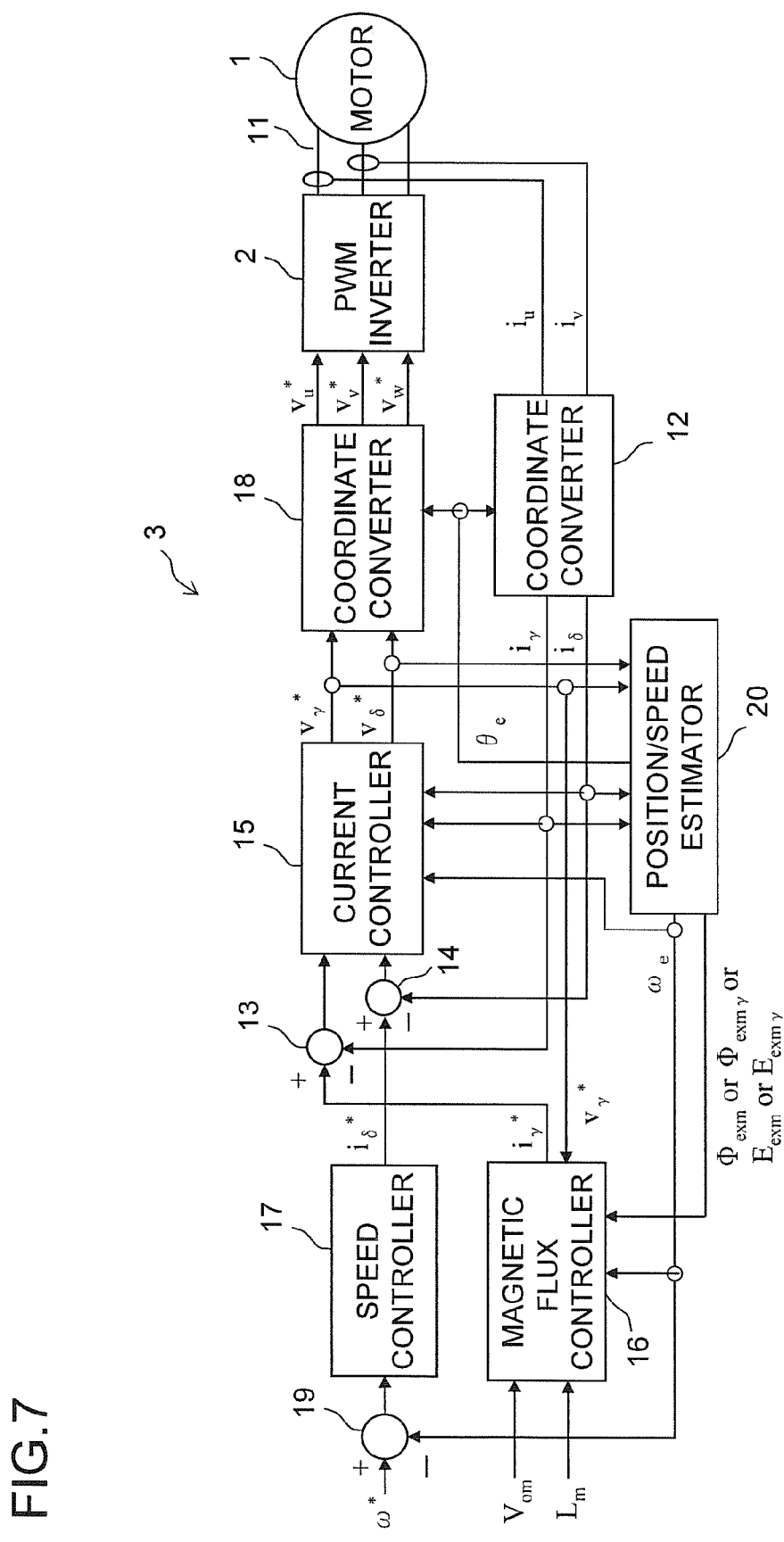
FIG. 7 is a diagram showing another configuration of the motor drive system shown in FIG. 4.
Figure 8:
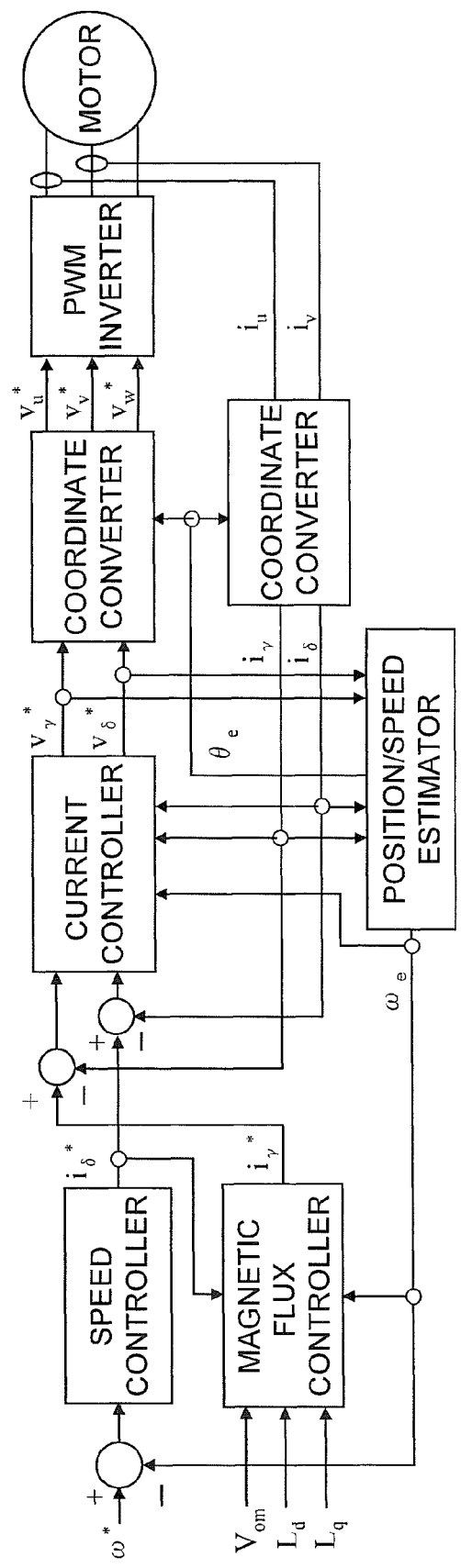
FIG. 8 is a configuration block diagram showing a conventional motor drive system.

FIG. 7 shows a configuration of the motor drive system in which $i_\gamma^*$ for flux-weakening control is calculated by using formula (E3), (E4), (E7), or (E8). In the motor drive system shown in FIG. 7, when calculating $i_\gamma^*$, $\omega_e$ is used as $\omega$, and $i_\gamma'$ is determined based on $i_\gamma^*$ calculated in the past.

Alternatively, in order to alleviate the calculation load, it is also possible to calculate $i_\gamma^*$ by ignoring $R_a i_\gamma'$ in formulae (E3), (E4), (E7), and (E8). Ignoring $R_a i_\gamma'$ causes almost no problem, because $v_\gamma^* \gg R_a i_\gamma'$ holds during high speed rotation that requires flux-weakening control.

Switching between maximum torque control and flux-weakening control is performed as follows. When $\omega^*$ or $\omega_e$ is equal to or higher than a predetermined speed, or at all times, the specified $\gamma$-axis current value $i_\gamma^*$ for keeping the voltage applied to the motor 1 at or below the voltage limit $V_{om}$ is calculated (that is, $i_\gamma^*$ is calculated by using any one of formulae (E1) to (E8)). If $i_\gamma^*$ thus calculated is zero or positive, flux-weakening control is found to be unnecessary, and $i_\gamma^*$ is set to zero or a predetermined value close to zero so as to achieve maximum torque control. On the other hand, $i_\gamma^*$ thus calculated is negative, flux-weakening control is found to be necessary, and the negative $i_\gamma^*$ thus calculated is fed to the subtractor 13 so as to achieve flux-weakening control. Doing so helps achieve smooth switching between maximum torque control and flux-weakening control.

As described in this embodiment, by estimating the axis (the qm-axis) coinciding with the current vector in maximum torque control, in the speed range in which no flux-weakening control is required, it is possible to make effective use of reluctance torque without calculating the specified $\gamma$-axis current value.

In this case, suppose that flux-weakening control is required due to a shortage of the source voltage. If flux-weakening control based on the conventional calculation formula is performed by switching to vector control based on the d-q axes, it is impossible to smoothly switch from maximum torque control to flux-weakening control (and vice versa). If smooth switching is impossible, at the time of switching, weakening magnetic flux becomes too small, producing variations in speed, or becomes too large, increasing losses.

To avoid this, as described in this embodiment, flux-weakening control based on the dm-qm axes is performed. This makes it possible to achieve smooth switching between flux-weakening control and maximum torque control based on the dm-qm axes, making it possible to make the motor operate with stability and efficiency in a wide range of rotation speeds.

MODIFICATIONS AND VARIATIONS

The embodiment described above may be modified as described in notes 1 to 7 below. Any feature of notes 1 to 7 described below can be applied, unless inconsistent, to any note other than that in connection with which the feature is specifically described.

Note 1

What has been described above deals with a case in which the $\delta$-axis, which is a control axis, is made to follow the qm-axis for the purpose of achieving maximum torque control (or control similar to it). Alternatively, it is also possible to perform vector control in such a way that the $\delta$-axis is made to follow a rotation axis other than the qm-axis, the rotation axis being different from the q-axis. Also in this case, the formulae described above hold, and it is possible to perform vector control similar to that described above. However, since the $\delta$-axis is displaced from the qm-axis, formulae such as formulae (B3) and (E2) presupposing that $\Delta\theta_m \approx 0$ do not hold.

By using a unified inductance $L_m$, which has conventionally been separated into $L_q$ and $L_d$, and using $\Phi_{exm}$ (or $E_{exm}$) instead of $\Phi_a$, it is possible to achieve satisfactory flux-weakening control on any coordinate axes displaced from the d-q axes.

For example, the $\delta$-axis is made to follow a rotation axis leading in phase the rotation axis whose direction coincides with that of the current vector to be fed to the motor 1 when maximum torque control is achieved. Giving an appropriate phase lead to the $\delta$-axis helps achieve maximum efficiency control.

Note 2

By referring to FIG. 4, an example of the motor control device that performs sensorless vector control has been described. Needless to say, what has been described above can also be applied to a case in which a position sensor (not shown) is used. In this case, the position sensor detects a real rotor position $\theta$, and the different parts of the motor control device operate based on the detected real rotor position $\theta$. As a result, the $\gamma$-axis and $\delta$-axis, each being a control axis, coincide with the dm-axis and qm-axis, respectively.

Note 3

Any of the different specified values (such as $i_\gamma^*$, $i_\delta^*$, $v_\gamma^*$, and $v_\delta^*$) and other state quantities (such as $\Phi_{exm}$, $\Phi_{exm\gamma}$, $E_{exm}$, and $E_{exm\gamma}$) mentioned above, that is, any value that needs to be derived as necessary may be derived in any manner. That is, such values may be derived, for example, through calculation performed within the motor control device 3, or may be derived from a previously set table data.

Note 4

As shown in FIG. 4, the current detector 11 may be so configured as to directly detect the motor current (armature current). Alternatively, the current detector 11 may be so configured as to detect the motor current by reproducing the motor current from the instantaneous current of the direct current on the power supply side.

Note 5

Part or all of the functions of the motor control device 3 is realized, for example, with software (a program) incorporated in a general-purpose microcomputer or the like. When the motor control device 3 is realized with software, the block diagrams showing the configurations of different parts of the motor control device 3 serve as functional block diagrams. Needless to say, the motor control device 3 may be realized with hardware alone, instead of software (a program), or may be realized with a combination of software and hardware.

Note 6

In the motor control device 3 shown in FIG. 4, the estimator 20 serves as an estimator that estimates $\Phi_{exm}$ and the like, and the magnetic flux controller 16 serves as a specified current value deriving portion that derives the specified $\gamma$-axis current value $i_\gamma^*$.

Note 7

In the present specification, to make the description simple, state quantities and the like are often referred to by their symbols (such as $i_\gamma$) alone; for example, the "$\gamma$-axis current $i_\gamma$" is sometimes referred to simply by "$i_\gamma$", and these should be understood to represent the same thing.

The present invention is suitable for electric devices of any kind that use a motor; for example, it is suitable for electric cars that run by exploiting the rotation of a motor, and compressors and the like used in air conditioners and the like.

What is claimed is:

1. A motor control device,
wherein, let an axis parallel to a magnetic flux produced by a permanent magnet provided on a rotor of a motor be called a d-axis,
let an axis leading the d-axis by an electrical angle of 90 degrees be called a q-axis, and
let control axes corresponding to the d-axis and the q-axis be called a γ-axis and a δ-axis, respectively,
then, the motor control device performs vector control of the motor with the γ-axis and the δ-axis made different from the d-axis and the q-axis, respectively, and with a motor current passing through the motor broken down into a -γ-axis current on the γ-axis and a δ-axis current on the δ-axis,
wherein the motor control device comprises:
an estimator that estimates, as an estimated magnetic flux, a flux linkage of an armature winding of the motor, or estimates, as an estimated induction voltage, an induction voltage generated by the flux linkage and a rotation of the motor; and
a specified current value deriving portion that derives, by using the estimated magnetic flux or the estimated induction voltage, a specified δ-axis current value to be followed by the δ-axis current, and
wherein the motor control device performs vector control of the motor in such a way that the γ-axis and the δ-axis follow an x-axis and a y-axis, respectively, that are different from the d-axis and the q-axis.

2. The motor control device of claim 1,
wherein, when a flux linkage vector on the d-axis is broken down into a flux linkage vector on the x-axis and a flux linkage vector on the y-axis, the estimator estimates, as the estimated magnetic flux, a magnitude of the flux linkage vector on the x-axis or a γ-axis component of the flux linkage vector on the x-axis,
wherein the specified current value deriving portion derives the specified γ-axis current value by using the estimated magnetic flux.

3. The motor control device of claim 2, wherein
based on the estimated magnetic flux and the δ-axis current or a specified δ-axis current value to be followed by the δ-axis current, the specified current value deriving portion derives the specified γ-axis current value.

4. The motor control device of claim 2, wherein
based on the estimated magnetic flux and a γ-axis component of a voltage applied to the motor, the specified current value deriving portion derives the specified γ-axis current value.

5. The motor control device of claim 1,
wherein, when an induction voltage vector generated in the motor, the induction voltage vector on the q-axis, is broken down into an induction voltage vector on the x-axis and an induction voltage vector on the y-axis, the estimator estimates, as the estimated induction voltage, a magnitude of the induction voltage vector on the y-axis or a δ-axis component of the induction voltage vector on the y-axis,
wherein the specified current value deriving portion derives the specified γ-axis current value by using the estimated induction voltage.

6. The motor control device of claim 5, wherein
based on the estimated induction voltage and the δ-axis current or a specified δ-axis current value to be followed by the δ-axis current, the specified current value deriving portion derives the specified γ-axis current value.

7. The motor control device of claim 5, wherein
based on the estimated induction voltage and a γ-axis component of a voltage applied to the motor, the specified current value deriving portion derives the specified γ-axis current value.

8. The motor control device of claim 1, wherein
the specified γ-axis current value derived by using the estimated magnetic flux or the estimated induction voltage is a specified γ-axis current value for flux-weakening control.

9. A motor drive system, comprising:
a motor;
an inverter that drives the motor; and
the motor control device of claim 1, the motor control device controlling the motor by controlling the inverter.

* * * * *